United States Patent
Doye et al.

(10) Patent No.: US 9,574,601 B2
(45) Date of Patent: Feb. 21, 2017

(54) BOLT

(71) Applicants: Mark Doye, Cambridgeshire (GB); Daniel Hardingham, Cambridgeshire (GB)

(72) Inventors: Mark Doye, Cambridgeshire (GB); Daniel Hardingham, Cambridgeshire (GB)

(*) Notice: Subject to any disclaimer, the term of this patent is extended or adjusted under 35 U.S.C. 154(b) by 143 days.

(21) Appl. No.: 14/470,037

(22) Filed: Aug. 27, 2014

(65) Prior Publication Data

US 2015/0093210 A1    Apr. 2, 2015

Related U.S. Application Data

(63) Continuation of application No. 13/806,304, filed as application No. PCT/GB2011/001106 on Jul. 25, 2011, now Pat. No. 8,845,252.

(30) Foreign Application Priority Data

Jul. 30, 2010  (GB) .................................. 1012882.5

(51) Int. Cl.
| | |
|---|---|
| F16B 39/282 | (2006.01) |
| F16B 35/06 | (2006.01) |
| F16B 39/02 | (2006.01) |
| B21J 5/00 | (2006.01) |
| F16B 33/06 | (2006.01) |
| F16B 33/00 | (2006.01) |
| F16B 43/00 | (2006.01) |

(52) U.S. Cl.
CPC ................ *F16B 39/282* (2013.01); *B21J 5/00* (2013.01); *F16B 33/06* (2013.01); *F16B 35/06* (2013.01); *F16B 35/065* (2013.01); *F16B 39/02* (2013.01); *F16B 39/023* (2013.01); *F16B 33/002* (2013.01); *F16B 43/00* (2013.01); *Y10S 411/957* (2013.01)

(58) Field of Classification Search
CPC ....... F16B 33/06; F16B 33/002; F16B 35/065; F16B 39/282; F16B 39/02; F16B 39/023
USPC ................. 411/166, 187, 418, 424, 957, 961
See application file for complete search history.

(56) References Cited

U.S. PATENT DOCUMENTS

| | | | |
|---|---|---|---|
| 1,451,999 A | 4/1923 | Perry | |
| 1,680,015 A * | 8/1928 | Davis ................... | F16B 33/002 411/187 |

(Continued)

FOREIGN PATENT DOCUMENTS

| | | |
|---|---|---|
| DE | 3133638 | 3/1983 |
| FR | 997085 | 10/1949 |
| GB | 2372304 | 8/2002 |

*Primary Examiner* — Roberta Delisle
(74) *Attorney, Agent, or Firm* — Wenderoth, Lind & Ponack, L.L.P.

(57) ABSTRACT

A bolt for securing timber to any other material, comprises: a bolt head with a series of spiked teeth on its underside; a cylindrical bolt rod extending from the bolt head is threaded and split into two rods at its free end, so as to define a slot therebetween.

In use a user drills a hole through pieces of timber to be secured together, and hammers the bolt through the hole. The spiked teeth on the bolt head lock into the timber, securing the bolt at one end. At the free, split end of the bolt rod, a washer and nut are tightened onto the bolt.

A cold chisel is hammered into the slot between the split ends of the rod, bending the ends outwards and thus preventing the nut from loosening.

20 Claims, 9 Drawing Sheets

(56) References Cited

U.S. PATENT DOCUMENTS

| | | | | |
|---|---|---|---|---|
| 2,008,229 A | * | 7/1935 | Sharp | F16B 35/04 |
| | | | | 411/424 |
| 2,093,171 A | | 9/1937 | Olson | |
| 2,150,126 A | | 3/1939 | Olson | |
| 2,253,241 A | * | 8/1941 | MacDonald | F16B 39/282 |
| | | | | 411/186 |
| 2,257,441 A | | 9/1941 | Wylie | |
| 2,270,813 A | | 1/1942 | Olson | |
| 2,292,195 A | * | 8/1942 | Brown | F16B 25/0021 |
| | | | | 408/218 |
| 2,833,326 A | | 5/1958 | Karl | |
| 2,959,204 A | * | 11/1960 | Rigot | F16B 39/282 |
| | | | | 411/186 |
| 3,120,254 A | * | 2/1964 | Waltermire | F16B 33/00 |
| | | | | 411/188 |
| 3,385,341 A | * | 5/1968 | Garstkiewicz | F16B 39/24 |
| | | | | 411/134 |
| 3,540,509 A | * | 11/1970 | Gutshall | F16B 39/24 |
| | | | | 411/134 |
| 4,900,208 A | | 2/1990 | Kaiser | |
| 5,183,359 A | * | 2/1993 | Barth | F16B 39/282 |
| | | | | 411/161 |
| 6,361,259 B1 | | 3/2002 | Koeppel | |
| 6,908,270 B1 | * | 6/2005 | Iwata | F16B 35/047 |
| | | | | 411/188 |
| 7,014,406 B2 | * | 3/2006 | Robertson | F16B 35/065 |
| | | | | 411/161 |
| 2011/0170983 A1 | * | 7/2011 | Day | F16B 39/24 |
| | | | | 411/370 |

* cited by examiner

BOLT

This application is a continuation of U.S. application Ser. No. 13/806,304, entitled "A BOLT", filed Mar. 8, 2013; which is a national stage of PCT/GB11/01106, entitled "A BOLT," filed on Jul. 25, 2011; which claims priority to United Kingdom Application No. 1012882.5, entitled "A BOLT", filed Jul. 30, 2010, the entirety of all three of which are explicitly incorporated herein by reference.

FIELD OF THE INVENTION

The present invention relates to an engineered bolt and more particularly, but not exclusively, the invention relates to an engineered bolt for securing pieces of timber together or pieces of timber to other materials.

BACKGROUND OF THE INVENTION

Often, those working in the construction industry, such as builders and carpenters, need to construct prefabricated items or structures from wood or timber. Pieces of wood or timber forming such items or structures were often secured one to another using fixings such as nails, screws or bolts.

Whilst screws and nails were useful for attaching small pieces of wood, one to another, the usual manner of securing larger pieces of timber together or securing timber to third party materials, for example of the sort used in frames and larger structures, involves drilling a hole through each material where they should be joined. There are then two traditional methods of securing the materials together:

Option 1—A metal bolt, usually made of steel, is passed through the hole, a nut and washer is then tighten onto the threaded end, so effectively clamping the pieces of timber or timber to a third party material together.

Option 2—A threaded rod is cut to the correct length to fit through the hole created, with a small excess on either side. A washer and a nut are tightened onto each end, holding the pieces of timber together, so effectively clamping the pieces of timber or third party material together.

These bolts/threaded rods were typically of a diameter between 8 mm and 20 mm.

Although this method was widely used, it suffered from several disadvantages.

The use of a 'coach bolt' in securing timber members has many drawbacks and limitations, namely:
1. It relies on the user to drill the correctly sized hole through the timber members. Due to the small head size in relation to the diameter size of the bolt, there is little tolerance for drilling an over-sized hole.
2. Due to the small surface area of the head to the bolt, it is usual for Building Control Officers to request the use of a 50 mm×50 mm washer.
3. It is a common occurrence for the bolt to turn within the timber before it is completely tight or has reached the correct torque.
4. It is also a common occurrence for the small head of the bolt to be pulled into the timber member, deforming the timber face, thereby reducing the effective structural depth of the timber as designed.
5. In the case of domed headed bolts the bolt makes it difficult to subsequently attach or fix finishing materials, such a plywood and plasterboard, as it is not possible to achieve a true level surface without remedial works being required.
6. There are instances which require the contractor to pass the bolt through the first member and then offer up the second member over the bolt. The second member pushes the bolt out of the first member adding to the frustration.
7. Due to the small surface area of the head to the bolt, it is difficult to achieve the correct torque to the nut without deforming the surface of the timber member. This is a particular issue when the head of the bolt is visible. It leads to an unsightly finish.
8. There is no facility to restrain the bolt in position.

The use of threaded rod in securing timber members also has many drawbacks and limitations, namely:
1. Wastage is excessive and common due to the bars being supplied in set lengths. It is exceptionally unusual to use the entire rod.
2. When the rod has been cut, the thread becomes deformed making it difficult to thread the nuts.
3. In order to fix the rod in position, it requires two sets of nuts and two sets 50 mm×50 mm washers, which adds expense and is often awkward.
4. It is a common occurrence that when tightening one nut, the shaft or bar has a tendency to turn within the opposing nut, thereby winding the rod through the timber members.
5. There is no facility to restrain the nut or threaded rod in position.
6. It is an awkward and time-consuming activity for those working in construction, as they must tighten one washer and nut onto one side of the threaded rod, then hold it in place with a spanner whilst tightening a washer and nut on the other side resulting in continuous access being required to both ends of the bolt, using two separate spanners, in order to secure the fixing. Space constraints commonly experienced on construction sites often restrict the possibility of achieving this.
7. The nuts can become loose and may be lost, decreasing the likelihood of the fabrication staying together and potentially putting people at risk.

Means of securing pieces of timber and other construction materials that require fewer parts are known in the art. For example, DE-A-3 133 638 (Bergner Richard GmbH) discloses a screw device with a head comprising a series of spiked teeth, which latch into the wooden material. However, the matter of the head of the bolt gouging into a work piece was not addressed.

Although the bolt described in DE-A-3 133 638 was an improvement upon existing methods, (because it required no nut or washer on one side of the work piece or building materials), the screw device disclosed made no attempt to further secure both ends of the bolt. The result was that despite a washer and nut being placed on a 'blind side', the bolt could still work loose. Furthermore, in many jurisdictions, building regulations require the bolt to fully pass through the surface it penetrated and to be secured by a nut. As such, in many situations, the screw device does not always meet building regulation standards.

Another example of a screw device is disclosed in UK Patent GB-B-2 372 304 (Rendell). A bolt with a hexagonal head is disclosed. The bolt has spikes formed in the head of the bolt. The spikes engage a surface and impede rotation of the bolt, for example when being tightened from a blind side of a work piece.

French Patent Application FR-A-997085 (Dehousse) discloses a bolt which has a notch formed at its end. This would not have been appropriate for joining two timber work pieces.

The present invention arose in order to provide an improved bolt which is quick and simple to install, cheap to manufacture and does not suffer from the aforementioned disadvantages of turning whilst being tightened, falling out of timber due fabrication, pulling through timber, working loose over time, as well as providing a safer way of joining timber pieces together or a timber to another structure, without the risk of bolts and nuts working loose.

SUMMARY OF THE INVENTION

According to a first aspect of the invention there is provided has a head, the surface area of which is at least $49 \times 10^{-6}$ m², and a shaft for receiving a nut, at least portion of which shaft is threaded and at least one engagement means is formed on an underside of the head of the bolt, the at least one engagement means being formed integrally with the head of the bolt by cutting and folding at least one shaped portion thereof, so as to define a scoop-shaped claw or tooth, the at least one engagement means is at least 2 mm in height so as to engage with a piece of timber and thereby provide optimum purchase with timber.

Therefore, in use, the invention ensures that the length of the bolt that is retained between the head and a washer and a nut is held constant. This is because the nut is locked at a specific location by the action of urging distal ends of the shaft The notch is advantageously formed symmetrically about the axis of the shaft. That is, in the case of a notch with parallel, planar opposing walls, the mid-point of the notch (that is the point half way between the opposing walls that define the notch), lies on the axis of the shaft.

Ideally the notch extends for a relatively short distance into the shaft. Typically the short distance to which the shaft extends is less than 20 mm, ideally less than 10 mm, preferably less than 8 mm and most preferably less than 5 mm.

The width of the notch is more than 1 mm and preferably less than 3 mm.

The notch may be formed with the shaft, for example by way of a forging or pressing stage or it can be formed by a sawing, cutting or punching process.

The axis of the notch is ideally parallel to the longitudinal axis of the shaft and ideally the side walls, defining the notch are substantially parallel. However, other shapes and types of notches may be formed, which do not have parallel walls. These include notches that are tapered inwards or outwards from the axis of the shaft; notches that are twisted (that is spiral) or curved; notches that have non-planar inner walls, for example notches that have a cylindrical inner surface; and notches that have saw-tooth or other surface profiles.

Advantageously the head of the bolt is shaped and dimensioned to be received by a spanner or similar means for applying torque. Ideally therefore the head of the bolt is hexagonal or preferably square. However, in some embodiments the bolt head may be round or oval or some other shape.

Preferably the thickness of the head is less than 5 mm; preferably it is less than 2 mm thick. The reason why the head of the bolt should be as thin as possible is so that when it is pressed into a work piece and tightened by a nut, the head lies flush, or as flush as possible, with the work piece, so presenting as flat a profile as possible. An advantage of this is that it allows subsequent sheets—such as plasterboard—to be placed over the head of the bolt. This was not the case with previous coach bolts as they presented a large profile which impinged on overlaid boards.

Preferably at least one tooth or other engagement means is provided on an underside of the head of the bolt.

Ideally a plurality of teeth or other engagement means are provided once on the underside of the head of the bolt. Optionally these teeth or other engagement means are formed integrally with the head of the bolt, although they may be attached thereto at a separate forming stage.

Preferably the, or each, tooth or engagement means is formed by selectively weakening or cutting suitably shaped portions from the bolt head and then folding or bending the cut, suitably shaped portions so as to define a scoop-shaped claw or tooth or engagement means.

Alternatively the, or each, engagement means is formed by pressing, casting, forging, punching or moulding suitably shaped portions integrally with the bolt head and arranging them so as to define a scoop-shaped claw or tooth.

An advantage with the scoop-shaped claw, tooth or other engagement means, is that it prevents the bolt, once in place, from loosening. This is because in use, the head of the bolt penetrates into the timber in such a manner as to resist a torque that is applied to the shaft that is in the opposite sense to the direction of the scoop-shaped claw, tooth or other engagement means. The engagement of the head of a bolt can be achieved by a minimal pressure of the bolt so as the scoop-shaped claw, teeth or other engagement means can engage with the work piece. This can be achieved by hand or with a tool which may be a spanner or wrench or by application of a gentle tap by a hammer or mallet.

Unlike the previous embodiments the teeth or other engagement means, such as a scoop or spike or claw, do not simply grip a work piece and prevent rotation of the bolt. Instead they penetrate material to a depth of at least 2 mm, preferably at least 3 mm and most preferably 4 mm or more with very large bolts, so as to provide optimum purchase. Because of the relatively large surface area of the teeth or other engagement means and their inherent material strength, once they have become embedded in the work piece, they are able to resist very large torques that may be transmitted to the shaft when the nut is tightened.

Ideally the teeth or other engagement means have sharp penetrating tips and these are most preferably triangular or pyramid-shaped penetrating points.

It is therefore apparent that once tightened these teeth or other engagement means engage with the work piece, they act as a gripping device and render the bolt secure against inadvertent loosening during use. The bolt performs optimally once the teeth or other engagement means of the bolt have penetrated to a minimum depth of around 3-5 mm. Because the head of the bolt presents a relatively large area this ensures that even if a user drills too large a hole for bolt, then the head provides a sufficiently large footprint to engage with the surface of the work piece.

Ideally the head of the bolt has a surface area of at least $25 \times 10^{-6}$ m, preferably the head of the bolt has a surface area of at least $49 \times 10^{-6}$ m, and most preferably the head of the bolt has a surface area of at least $100 \times 10^{-6}$ m. These areas correspond to lengths of a square headed bolt of 5 mm, 7 mm and 10 mm respectively. However, larger, square headed bolts, for example greater than 10 mm square, are also within the scope of this invention. For example the head of the bolt may be sized so that it is at least 2 cm×2 cm square, preferably 3 cm×3 cm square most preferably 4 cm×4 cm, and, and possibly even larger in specific applications.

Because the teeth of the bolt penetrate the material to a depth of at least 5 mm, a substantial reactive force is presented to any torque that is applied to a nut connected to the remote end of the bolt.

To this end, disclosed is a bolt for securing timber, comprising: a bolt head with a series of spiked teeth on its underside; a cylindrical bolt rod extending from the bolt head comprising a thread and a splitting into two rods at its free end, forming a slot between them.

In use, a carpenter or builder drills a hole through the pieces of timber to be secured together, and places the bolt through the hole. The spiked teeth on the bolt head are shaped and dimensioned to cut into the timber and engage therewith, so securing the bolt at one end. At the free end of the bolt, where the notch is formed, the shaft is effectively split into two portions. A washer and nut are then placed onto the free end of the bolt and tightened onto it.

The user then urges the two split portions, defined by the notch, apart so they are slightly splayed. This may be achieved for example by gently tapping a cold chisel into the slot between the split ends of the rod or bending the ends outwards, for example with a flat head screwdriver or other similar tool, thus preventing the nut from loosening because the diameter of the end of the shaft has been increased by a small amount sufficient to entrap the nut on the shaft and prevent it from unwinding.

It can be seen from the invention that a bolt is provided for securing pieces of timber together and that the bolt does not require separate parts; is easy to install and cannot simply loosen and fall out of position.

Another advantage of the present invention is that it secures pieces of timber with fewer individual parts and in much less time. Therefore less material is used.

A yet further advantage is that the head of the bolt, once engaged with a work piece, does not turn whilst the nut is tightened.

Another advantage is that once the bolt is placed into position it does not fall out of the timber and is self-securing, so enabling a single person to erect buildings and structures easier than was previously the case.

The invention will now be described, by way of example only and with reference to the following drawings, in which:

DETAILED DESCRIPTION OF A PREFERRED EMBODIMENT

Figure 1:
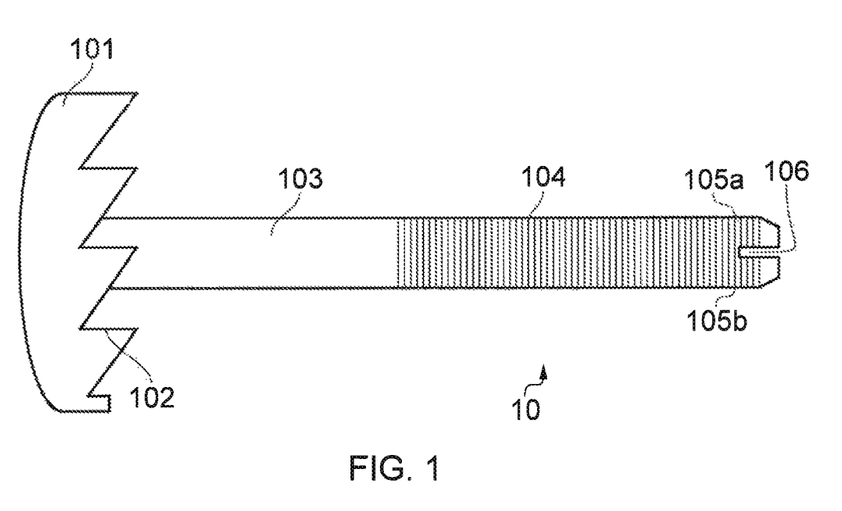
FIG. 1 shows a diagrammatical side elevation of an embodiment of the invention with a rounded bolt head.
Figure 2:
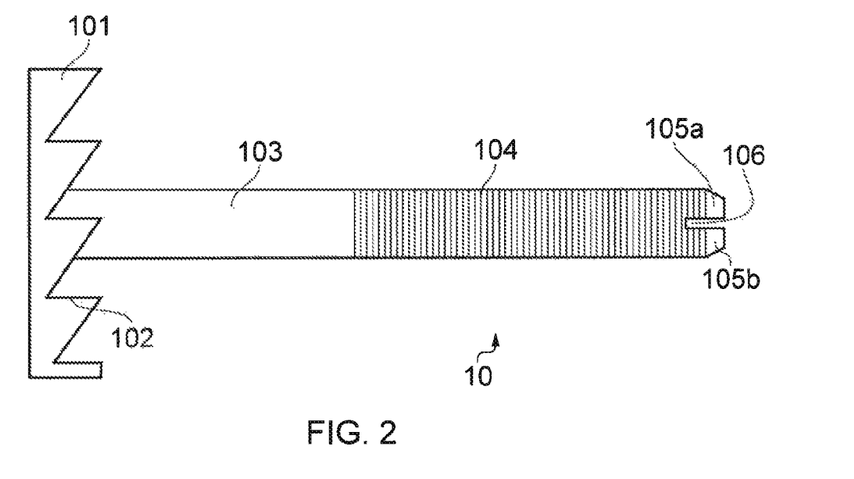
FIG. 2 shows a diagrammatical side elevation of an embodiment of the invention with a flat, square bolt head.

Referring to the Figures generally and specifically FIGS. 1 and 2 which show a bolt 10, suitable for securing timber. Bolt 10 comprises a bolt head 101 with a series of spiked engagement means, in the form of teeth 102 on its underside.

A cylindrical bolt rod 103 extends from the bolt head 101. A portion of the shaft of the bolt rod 103 has a thread 104 formed thereon. The end of the bolt rod 103 is split into two portions 105a and 105b at its free end, defining a slot 106 between the two portions 105a and 105b.

Bolt head 101 may be of any known bolt head form, for example, it may be a pan head, a domed head, a round head, a truss head or any other, but is ideally square shaped. The bolt head 101 includes a plurality of spiked teeth 102 on its underside, which, in use, contact a work piece to be secured. Spikes 102 are sufficiently sharp to pierce the timber and thus grip onto it.

Figure 3:
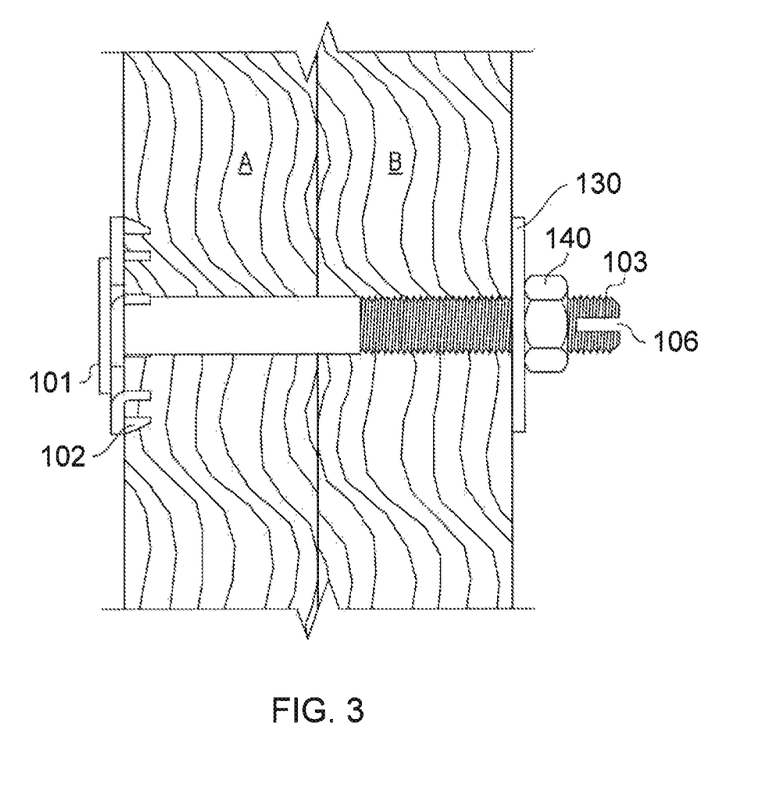
FIG. 3 shows in diagrammatical form the bolt holding two pieces of wood together.

FIG. 3 shows in diagrammatical form the bolt holding two pieces of wood A and B together. The cylindrical bolt rod 103 extends from the bolt head 101 and may be provided in any thickness or length as shown for example in FIGS. 8a to 8e.

Figure 4:
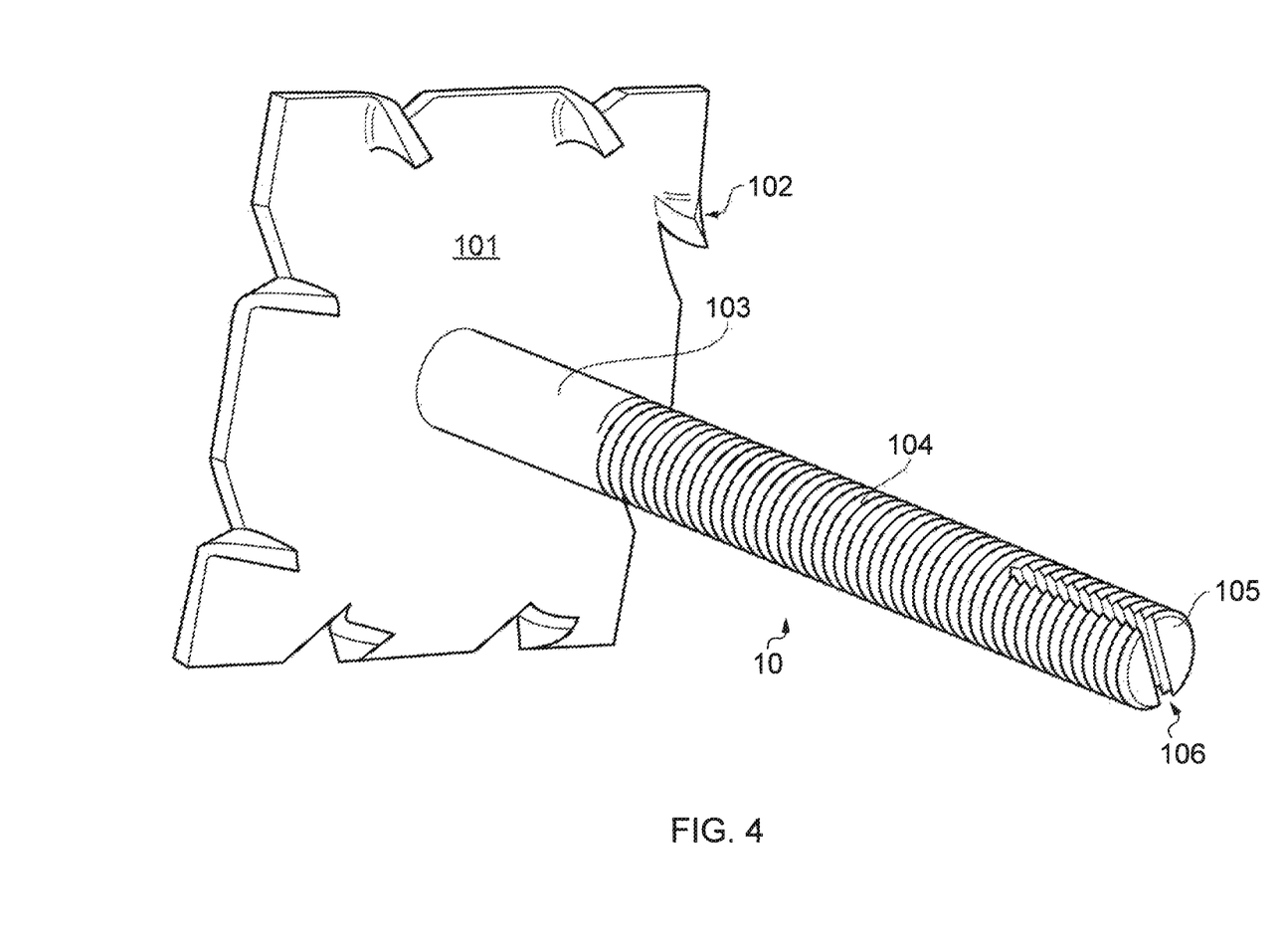
FIG. 4 is an overall view of a preferred embodiment of the invention.

FIG. 4 shows an overall view of the bolt and illustrates how the thread 104 extends along the cylindrical bolt rod 103. However, the thread 104 may extend only part way along the entire rod 103 as appropriate. At the free end of the rod 103, distal from the bolt head 101, the rod 103 splits into two rod portions 105a and 105b forming a slot 106 in between them. The two rod portions 105a and 105b are of sufficient dimensions and strength so that they are adapted to bend and not break or snap. This may be achieved by tapering them and/or by treating the portion of the bolt in a manner so as to render the material more flexible than the remaining part of the bolt. The reason for the slot 106 is explained with reference to FIGS. 5a and 5b, which show in exploded form views of the slot before (FIG. 5a) a chisel or other tool 201 is urged into the slot 106 and after (FIG. 5a) a chisel or other tool 201 is urged into the slot 106 and has caused deformation of the two portions 105a and 105b.

The entire bolt is preferably formed from steel, but any other suitable material known in the art may be used. For example, bolts may be formed from an alloy, aluminum, chrome, brass or synthetic plastics materials or a composite material. The bolt may be plated chrome or coated in insulating or with a conductive material, such as gold. Bolts may be galvanized or powder coated. Bolts may be coloured in order to distinguish them from conventional bolts, so that for example a builder can locate them, easily in a tray of similar bolts. Different colours may be used for different sized bolts—eg M10 may be red, M12 may be blue and M14 may be yellow or different colours may be used to distinguish different size, or different shape, slots.

Figure 5A:
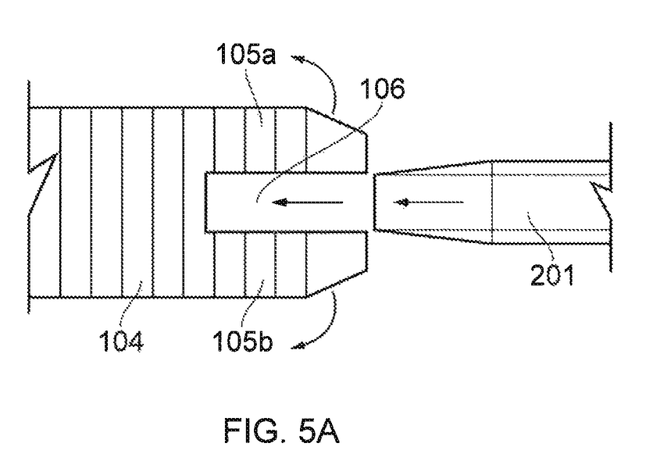
FIGS. 5a and 5b show detailed views of the distal end of the bolt and how a tool is used to split the ends of the bolt, when urged into the slot.
Figure 5B:
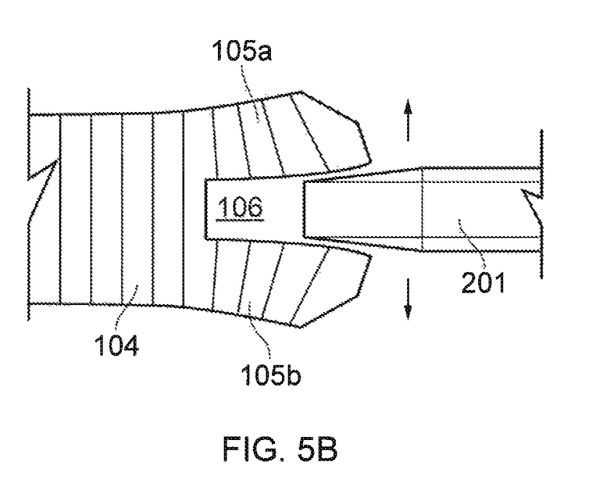

Referring briefly to FIGS. 3, 4 and 5, in use, a user (not shown) drills a hole through two pieces of timber A and B to be secured together. The user forces bolt 10 through the two pieces of timber—eg by hand or by way of a hammer. Spiked teeth 102 on bolt head 101 lock into the timber, securing the bolt on one face of timber A. At the free, split end of the bolt rod 103, a washer 130 and nut 140 are tightened onto the bolt. A cold chisel (not shown) is then gently hammered into the slot 106 between the split ends 105a and 105b of the bolt rod, bending the tips of the ends 105a and 105b outwards, thus preventing the nut 140 from loosening. This feature of the invention is particularly advantageous because the splayed ends 105a and 105b of the bolt prevent inadvertent removal or loosening of the nut from the bolt and therefore importantly ensures that the length of the bolt that is retained between the head 101 and the washer 130 is held constant. This is because the nut is locked at a specific location by the action of the splayed leg portions 105a and 105b.

Figure 6A:
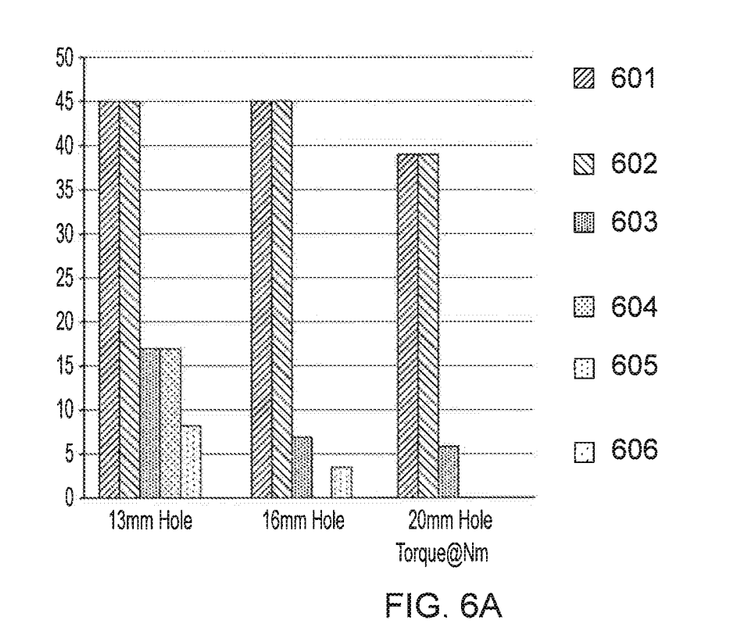
FIGS. 6A and 6B are two graphs showing relative resistance to torque of bolts according to the invention when compared with existing bolts of similar dimensions.
Figure 6B:
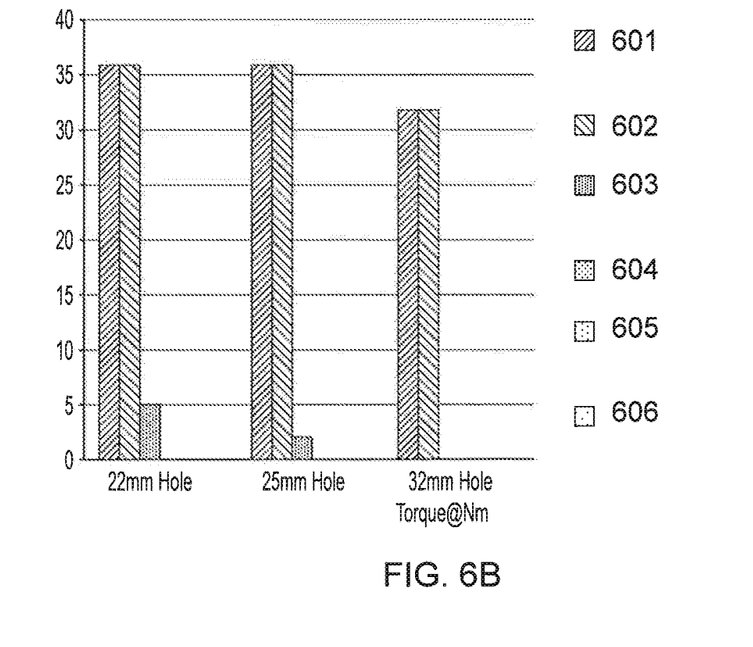
Figure 7:
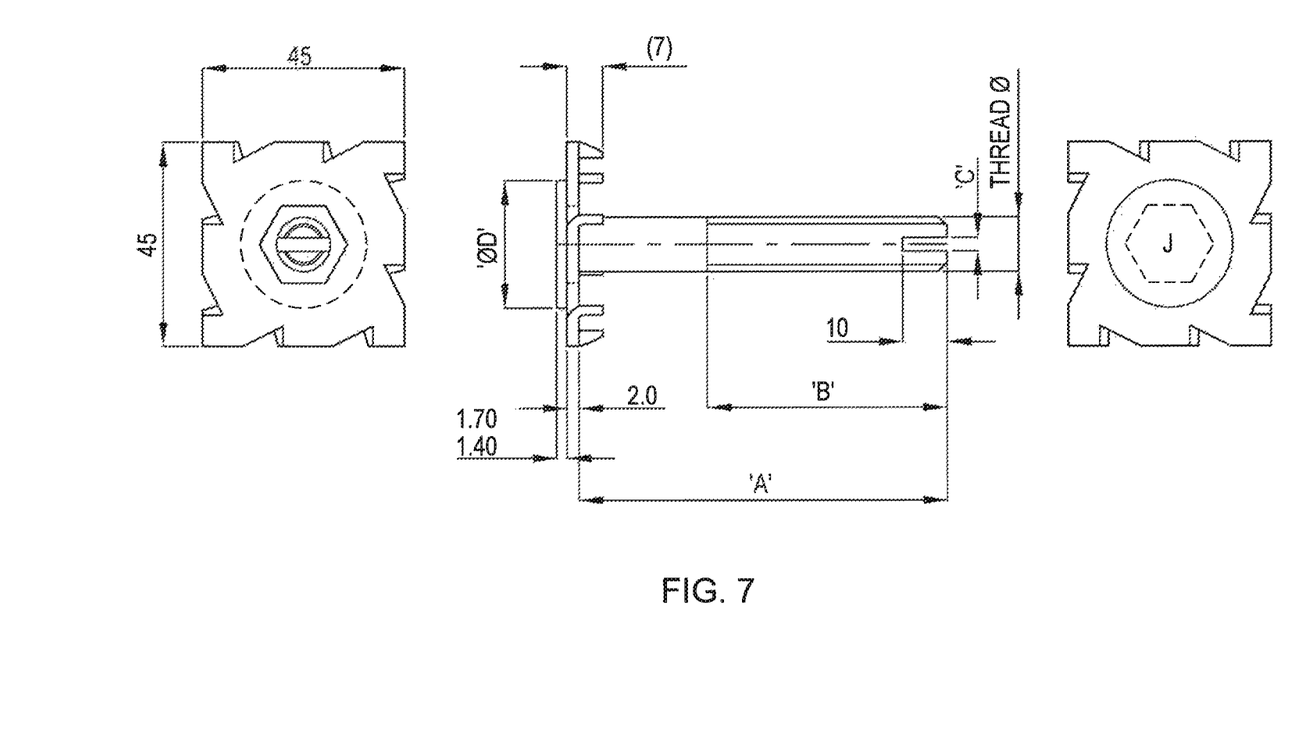
FIG. 7 is plan, under plan and elevation views of a preferred embodiment of the invention.
Figure 8A:
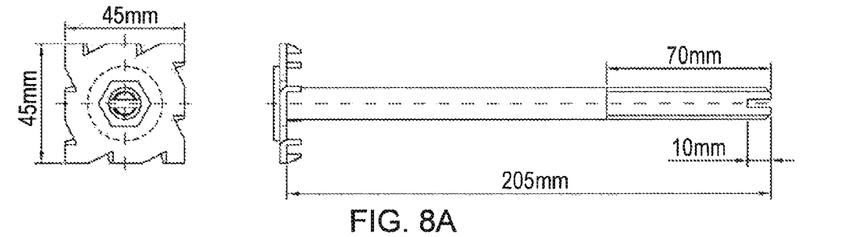
FIGS. 8a to 8e show under plan and side elevation view of 5 alternative embodiments of the invention.
Figure 8B:
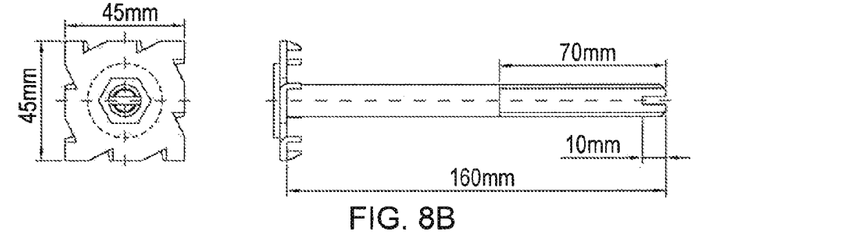
Figure 8C:
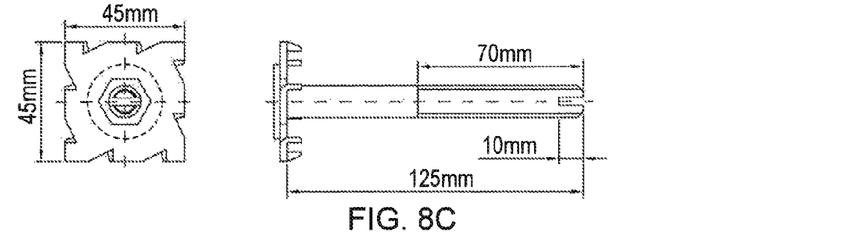
Figure 8D:
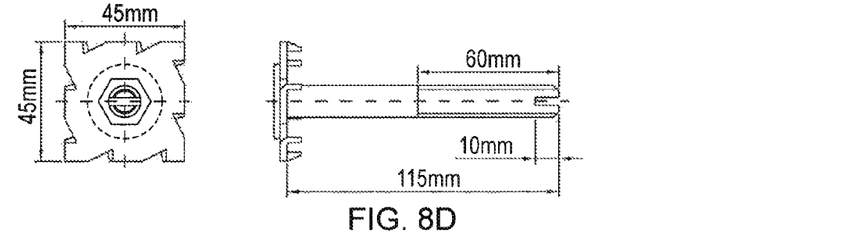
Figure 8E:
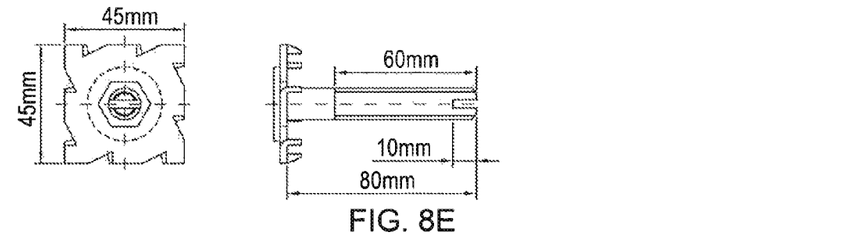

Referring briefly to FIG. 6 which shows two graphs that illustrate the relative resistance to torque of bolts according to the invention, when compared with existing bolts of similar dimensions. It can be seen that as a result of the teeth penetrate into the work piece, that torsional loading is transmitted across a larger surface area—determined by the spacing of the teeth from the axis of the bolt shaft—and so a bolt is less likely to twist and cut its way into a work piece. The advantage of this that the length of the bolt that grips a work piece remains constant.

Figure 9A:
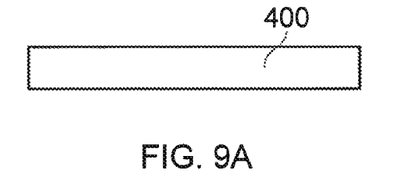
FIGS. 9a to 9i illustrate steps in a preferred method of forming the bolt.
Figures 9B, 9C:
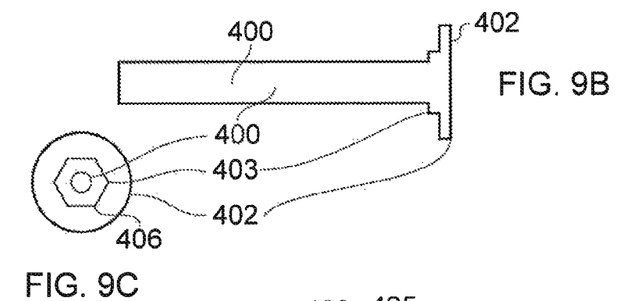

Brief reference will now be made to FIGS. 9a to 9j which illustrates a manufacturing method for forming the bolt 10. FIG. 9a shows the beginning of the process, commencing with blank wire 400. Typically the diameter of the wire 400 ranges from 8 mm to 20 mm. The wire is deformed using a specialised apparatus that squashes the wire and cold forms a head 402. FIG. 9c shows an under plan view of the preformed bolt which has a key 406 shaped in the form of a hexagon.

Figure 9D:
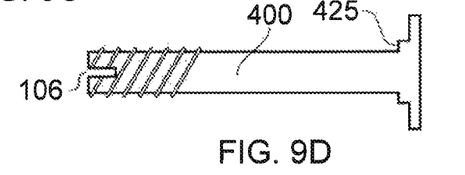
Figure 9E:
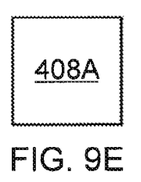
Figure 9F:
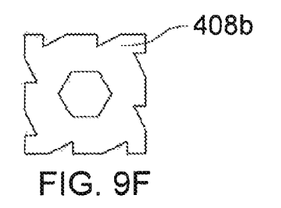

FIG. 9d shows how a thread is cut into the wire and a slot 106 is formed at its end. A key 406 is shaped and dimensioned to be received by a specially formed washer 408b, which initially is in the form of a square of steel 408a (FIG. 9e) which has an hexagonal shape cut from it and tangs 410 punched in it to it and these are then folded downwards.

Figure 9G:
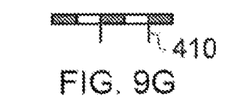
Figure 9H:
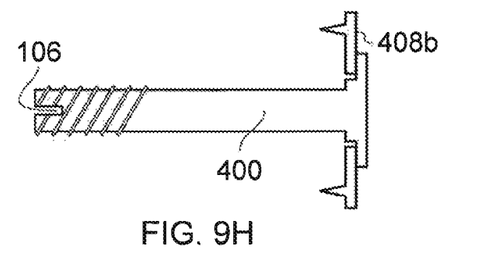
Figure 9I:
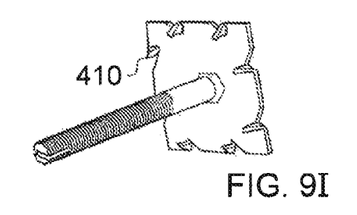

The tangs 410, shown in FIG. 9g, define the plurality of spiked teeth 102. They are angled in the same sense as the thread so that, when a torque is applied to the bolt, they twist into a work piece. The final stage of the manufacturing process introduces the preform wire 400 into the washer 408b which is then pressed to form a circular locator 412. The locator ensures there is a good fit with the hexagon in the washer and provides a fillet of material which is cold upset (in a manner similar to forming a rivet head) so that the material is folded over the hexagonal head 406 and so locks it in place in the washer.

| Thread Ø | A | B | C | D |
|---|---|---|---|---|
| M8 | 80 | 60 | 2.0 | 23 |
|  | 115 | 60 |  |  |
|  | 125 | 70 |  |  |
| M10 | 80 | 60 | 2.0 | 28 |
|  | 115 | 60 |  |  |
|  | 125 | 70 |  |  |
| M12 | 80 | 60 | 3.0 | 28 |
|  | 115 | 60 |  |  |
|  | 125 | 70 |  |  |
| M14 | 80 | 60 | 3.0 | 28 |
|  | 115 | 60 |  |  |
|  | 125 | 70 |  |  |

The invention has been described by way of example only and it will be appreciated that variation may be made to the embodiments described without departing from the scope of the invention. For example the head of the bolt can be shaped to receive an Allen key or other suitable tool for applying torque to the head of the bolt.

The invention claimed is:

1. A bolt comprising:
a square head, a surface area of which is at least $49 \times 10^{-6}$ m$^2$, the square head including a non-circular recess; and
a shaft, bonded to the non-circular recess in the square head, for receiving a nut, at least a portion of which shaft is threaded;
the head including a folded engagement means on an underside of the head of the bolt, the folded engagement means corresponding to a cut section of the head, and having a scoop-shaped tooth at least 2 mm in height so as to engage with a piece of timber and thereby provide optimum purchase with the piece of timber.

2. The bolt according to claim 1, wherein:
the head of the bolt is shaped and dimensioned to be received by a spanner to apply torque.

3. The bolt according to claim 2, wherein:
the bolt is chrome plated.

4. The bolt according to claim 2, wherein:
the bolt is galvanized.

5. The bolt according to claim 1, wherein:
the folded engagement means is cut from the head of the bolt.

6. The bolt according to claim 1, wherein:
the folded engagement means is a selectively weakened portion from the head of the bolt, bent so as to define the scoop-shaped tooth.

7. The bolt according to claim 1, wherein:
the folded engagement means is pressed from the bolt head and arranged so as to define the scoop-shaped tooth.

8. The bolt according to claim 1, wherein said engagement means comprises:
four teeth, each located at a corner of a rectangle formed by the head of the bolt.

9. The bolt according to claim 1, wherein:
the folded engagement means is at least 3 mm in height.

10. The bolt according to claim 1, wherein:
the folded engagement means is at least 4 mm in height.

11. The bolt according to claim 1, wherein:
the folded engagement means has at least one sharp penetrating tip.

12. The bolt according to claim 1, wherein:
the folded engagement means having the scoop-shaped tooth includes a triangular penetrating point.

13. The bolt according to claim 1, wherein:
the folded engagement means is located along edges of the head of the bolt.

14. The bolt according to claim 1, wherein:
the folded engagement means is located at each edge of the head of the bolt.

15. The bolt according to claim 1, wherein:
a surface area of the head of the bolt is at least $100 \times 10^{-6}$ m.

16. The bolt according to claim 1, wherein:
the bolt is formed from steel.

17. The bolt according to claim 1, wherein:
the head of the bolt is shaped and dimensioned to be received by spanner means for applying torque.

18. The bolt according to claim 1, wherein:
the folded engagement means is forged from the bolt head and arranged so as to define the scoop-shaped tooth.

19. The bolt according to claim 1, wherein:
the shaft is bonded to the non-circular recess in the square head by way of a swaged joint.

20. A bolt comprising:
a square head, a surface area of which is at least $49 \times 10^{-6}$ m$^2$, the square head including a non-circular recess; and
a shaft, bonded to the non-circular recess in the square head, for receiving a nut, at least a portion of which shaft is threaded;
the head including a folded engagement means on an underside of the head of the bolt, the folded engagement means corresponding to a cut section of the head, and having a scoop-shaped claw at least 2 mm in height so as to engage with a piece of timber and thereby provide optimum purchase with the piece of timber.

\* \* \* \* \*